Aug. 21, 1962   L. C. MILLER   3,050,074
VEHICLE TENT AND TENT CARRIER
Filed Feb. 3, 1960
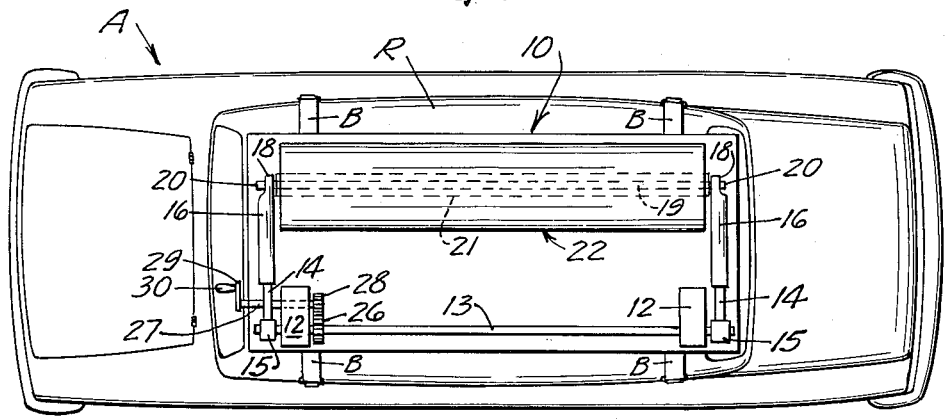
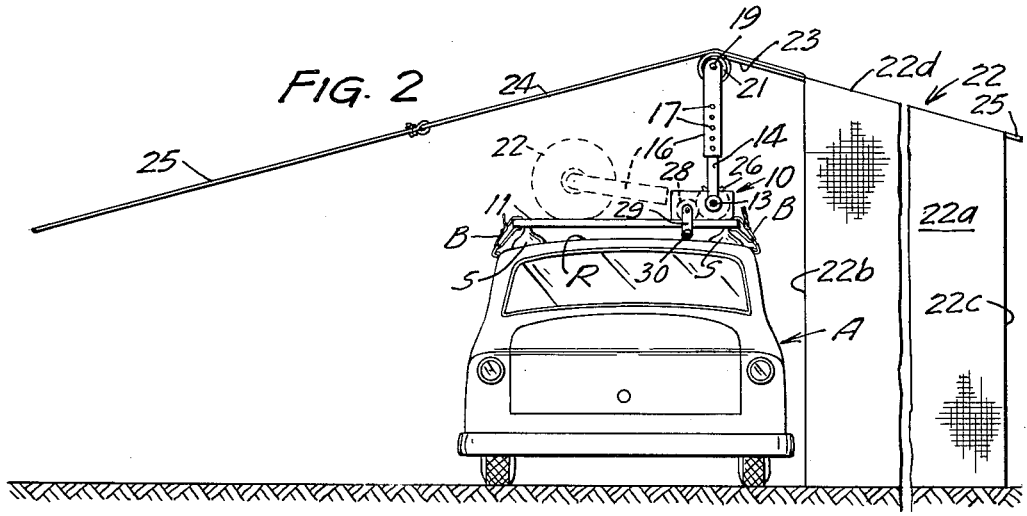
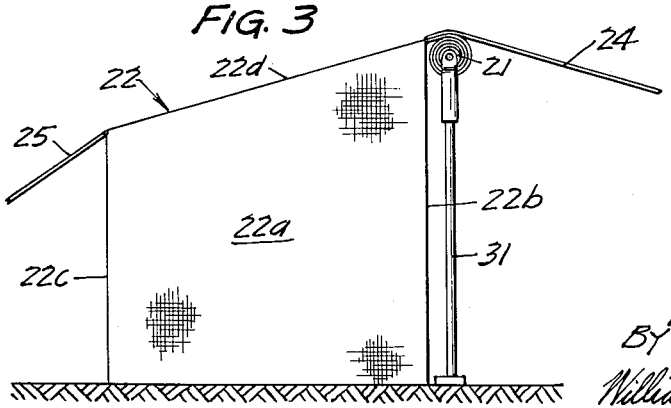
INVENTOR
LOUIS C. MILLER
BY
Williamson, Schroeder & Halmatier
ATTORNEYS

United States Patent Office 3,050,074
Patented Aug. 21, 1962

3,050,074
VEHICLE TENT AND TENT CARRIER
Louis C. Miller, Rte. 2, Sebeka, Minn.
Filed Feb. 3, 1960, Ser. No. 6,509
2 Claims. (Cl. 135—1)

This invention relates to vehicle carrier apparatus and more particularly to vehicle carrier apparatus of the type for supporting flexible shelters or the like.

An object of this invention is to provide a novel vehicle carrier apparatus of simple and inexpensive construction.

Another object of this invention is to provide a novel vehicle carrier apparatus for mounting on a vehicle roof and including a windable device arranged and constructed for ready shifting thereof from a transport position to a position of use.

A more specific object of this invention is to provide a novel vehicle carrier apparatus adapted to be mounted on the roof of a vehicle and including a reel-mounted tent structure arranged and constructed to be readily shifted from a position of support upon the vehicle to a position of use adjacent the side of the vehicle.

A further object of this invention is to provide a novel and improved carrier apparatus adapted to be mounted on the roof of a vehicle and having a reel-mounted tent structure including actuating means for quickly positioning the tent adjacent the side of the vehicle for ready erection thereof.

These and other objects and advantages of this invention will more fully appear from the following description, made in connection with the accompanying drawings, wherein like reference characters refer to the same or similar parts throughout the several views, and in which:

FIG. 1 is a top plan view of the novel vehicle carrier apparatus shown mounted on the roof of an automobile with the reel-mounted tent structure shown in the transport position;

FIG. 2 is an end elevational view of the carrier apparatus with the tent structure shown in erected condition in full line configuration and shown in the transport position in dotted line configuration; and FIG. 3 is a fragmentary end view of the tent with the reel structure shown detached from the carrier and mounted on the supporting tent pole.

Referring now to the drawing, it will be seen that my novel vehicle carrier apparatus, generally designated as 10, is shown mounted on the roof R of a conventional automobile A.

The novel vehicle carrier apparatus 10 includes an elongate support frame or base member 11 which is of generally flat rectangular shape and may be provided with suction cups S and flexible bands B for securing the same to the roof R of automobile A. It is, of course, understood that the suction cups and flexible bands may be omitted so that the support frame may be removably secured to a conventional carrier rack which in turn would be mounted on the roof of the automobile. Support member 11 is also provided with upright members 12 affixed adjacent opposed ends thereof and being disposed adjacent one side edge of the supporting frame 10. An elongate shaft 13 is journalled for rotation in upright members 12 and has its respective ends projecting longitudinally from the members.

A pair of elongate arms 14 are each provided with a sleeve 15 secured to one end thereof which in turn is affixed to an end of elongate shaft 13. It will be noted that elongate arms 14 are disposed in subtantially parallel relation with respect to each other and are thus rotatable with elongate shaft 13. Each of the arms 14 are telescopically received within an outer section 16 and each of which is adjustable axially relative to its respective arm.

Each of the outer sections 16 are provided with a plurality of longitudinally spaced apertures 17 which may be positioned in registering relation with a plurality of apertures formed in each of the arms 14, not shown, and through which a retaining pin may be passed for retaining the outer section 16 in an axially adjustable position.

Referring now to FIG. 1, it will be seen that the outer ends of each of the outer telescoping sections 16 are flattened as at 18 and an elongate shaft 19 extends therebetween. Shaft 19 is provided with enlarged head portions 20 at its ends which serve to affix shaft 19 to the flattened outer end portions 18 of telescoping sections 16. An elongate windable device or reel structure 21 is journalled for rotation about elongate shaft 19. Thus it will be seen that arms 14 and their respective telescoping sections 16 define a pivotal support structure for the reel structure 21.

A flexible shelter or tent 22 includes side wall 22a, only one of which is shown, and front wall 22b, rear wall 22c and a covering or top 22d. It will be noted that the front wall 22b is of a substantially greater height than the rear wall 22c and door, of course, is formed in the front wall 22b although not illustrated in the drawing. It is to be understood, of course, that flexible shelter 22 may be of different configurations than the one illustrated. Flexible shelter 22 is provided with a short attachment flap 23 which has an end secured to the shelter top 23d and has its other end thereof secured to the reel structure 21. Flexible shelter 22 is also provided with a relatively large car canopy 24 which, as seen in FIG. 2, extends over the automobile when the tent is in the erected condition. Tent 22 may also be provided with guy ropes 25 which may be secured to trees or other support structure for maintaining the tent in its erected condition. Referring now to FIG. 1, it will be seen that the flexible shelter or tent 22 may be wound upon reel structure 21 when the tent is not in use and the reel may be swung into a transport position upon the supporting frame 11.

Means are provided for swinging the arms 14 and reel structure 21 to and from a position of transport and include a gear element 26 in the form of a conventional spur gear and which is affixed to shaft 13 adjacent one of the upright supporting members 12. A crank shaft 27 is also journalled for rotation in one of the upright support members 12 and is disposed in substantial parallel relation with elongate shaft 13. Crank shaft 27 has a gear element or pinion gear 28 affixed to one end thereof and which is in enmeshing relation with spur gear 26. Crank shaft 27 also has a crank arm 29 affixed thereto which in turn is provided with a handle 30. It will therefore be seen that by cranking or rotating crank shaft 27, the elongate shaft 13 and arms 14 are caused to rotate also.

When the flexible shelter or tent 22 is wound upon reel structure 21, the reel structure may be positioned for transport as illustrated in FIG. 1 and which is also illustrated in FIG. 2 in dotted line configuration. It will be noted that when in the transport position, the arms 24 are disposed in substantially parallel relation with the supporting frame 11 and that the reel structure with the flexible tent wound thereon is positioned to lie upon the supporting frame 11. When it is desirable to set up or erect the flexible shelter 22, crank shaft 27 is rotated by means of handle 30 which in turn pivots arms 14 in a vertical plane and the arms are caused to move transversely of the supporting frame 11. It should also be noted that arms 14 are swingable through an arc of substantially 180° so that the reel structure 21 may be disposed in laterally spaced relation with respect to the side of the automobile A. The flexible shelter or tent 22 may thereafter be unrolled and the guy rope 25, attached to the rear of the tent, may be secured to a suitable support structure. The telescoping section 16 may thereafter be adjusted axially with respect to the arms 14 to any desired position and the arms 14 may thereafter be rotated to position them in an upstanding relation with respect to the supporting frame 11. The guy rope 25, which is secured to the car canopy 24, is then attached to a suitable support structure and the tent is therefore erected for use.

It should be noted that the arms 14 may be disposed in substantial vertical relation with respect to the supporting frame, as shown in FIG. 2, or that the arms may be disposed in upstanding inclined relation with respect to the supporting frame 11.

In some instances, it is desirable to move the automobile A without having to strike or collapse the tent structure 22 and this may be accomplished by removing the telescoping sections 16 and positioning them upon a supporting pole 31 which is disposed closely adjacent the front of the tent as best illustrated in FIG. 3. The pinion and spur gear arrangement, of course, permit a substantial mechanical advantage to be gained during shifting of the reel and tent structure which are quite heavy and bulky.

It will therefore be seen from the foregoing description that I have provided a novel vehicle carrier apparatus which is adapted to be mounted on the roof of a vehicle and which includes a reel-mounted flexible shelter uniquely constructed for ready erection and which is arranged to be readily shiftable from a transport position to a position of use. It will also be noted from the preceding paragraphs that my novel vehicle carrier apparatus includes an actuating mechanism for readily shifting the reel and tent structure between a transport position to a position of use with a minimum of effort. It will therefore be seen that my novel vehicle carrier apparatus is of compact construction and includes a minimum of parts which makes it ideal for hunting and camping trips. Many of the conventional tent structures include a plurality of parts and must be laboriously packed and unpacked which is a time consuming operation. The erection of such tents also requires the concerted efforts of several persons which is objectionable because of the time and effort expended during this operation. It will therefore be seen that I have provided a uniquely constructed vehicle carrier apparatus and tent which may be erected, collapsed and moved to and from the transport position with a minimum of time and effort.

It will, of course, be understood that various changes may be made in the form, details, arrangement and proportions of the parts without departing from the scope of my invention which consists of the matter shown and described herein and set forth in the appended claims.

What is claimed is:

1. A vehicle tent carrier apparatus comprising an elongate supporting frame adapted to be mounted on the roof of a vehicle to extend longitudinally thereof, an elongate shaft rotatably mounted on said frame and extending longitudinally thereof, a pair of elongate arms each being affixed to one end of said shaft, each of said arms having an outer section telescopically mounted thereon, an elongate reel structure extending between and secured to said outer sections and having tent structure secured thereto and wound thereon, an actuating crank rotatably mounted on said support and having a driving gear affixed thereto, and a driven gear mounted on said shaft and engageable with said driving gear whereby said arms may be adjustably positioned from a horizontal position to upright position with respect to said frame upon rotation of said crank.

2. A vehicle tent carrier apparatus for use with conventional automobile vehicles, said apparatus comprising an elongate support structure, means on said support structure for detachably mounting the frame on the roof of an automotive vehicle to extend longitudinally thereof, an elongate shaft rotatably mounted on said support structure and extending longitudinally thereof, said shaft being journaled for rotation about its longitudinal axis and being disposed adjacent one side of the support structure, a pair of longitudinally adjustable, elongate substantially straight arms each being affixed to one end portion of said shaft and being movable therewith, an elongate reel structure extending between and journalled to the outer end portions of said arm for rotation relative thereto, a tent structure formed of flexible material and being secured to said reel and wound thereon, actuator means drivingly connected with said shaft and being operable for rotating said shaft to thereby swing the tent supporting reel from an inoperative position upon said support structure to an operative position adjacent said one side of the support structure, said actuator means including an actuator crank rotatably mounted on said support structure and having a driving gear affixed thereto, and a driven gear keyed to said shaft and being disposed in enmeshing relation with said driving gear and being driven thereby.

References Cited in the file of this patent

UNITED STATES PATENTS

| | | |
|---|---|---|
| 987,593 | O'Maley | Mar. 21, 1911 |
| 1,733,007 | Dahl | Oct. 22, 1929 |
| 1,801,711 | Asher | Apr. 21, 1931 |
| 1,825,183 | Frisby | Sept. 29, 1931 |
| 1,958,169 | O'Neill | May 8, 1934 |
| 2,097,923 | Hutchinson | Nov. 2, 1937 |
| 2,625,165 | Eskew | Jan. 13, 1953 |
| 2,788,791 | Pospisil et al. | Apr. 16, 1957 |
| 2,811,321 | La Barre | Oct. 29, 1957 |